United States Patent
Brown et al.

[11] Patent Number: 5,906,740
[45] Date of Patent: May 25, 1999

[54] SPIN-ON FILTER WITH IMPROVED RETAINING GROOVE

[75] Inventors: Gene W. Brown; David A. Biere, both of Kearney, Nebr.

[73] Assignee: Baldwin Filters, Inc., Kearney, Nebr.

[21] Appl. No.: 08/997,136

[22] Filed: Dec. 23, 1997

[51] Int. Cl.[6] .................................................. B01D 27/08
[52] U.S. Cl. ....................... 210/450; 210/440; 210/443; 210/DIG. 17
[58] Field of Search ................ 210/DIG. 17, 440, 210/443, 444, 450

[56] References Cited

U.S. PATENT DOCUMENTS

| | | | |
|---|---|---|---|
| 4,400,864 | 8/1983 | Peyton et al. | 210/440 |
| 4,743,374 | 5/1988 | Stifleman | 210/440 |
| 4,834,885 | 5/1989 | Misgen et al. | 210/440 |
| 5,080,787 | 1/1992 | Brown et al. | 210/232 |
| 5,322,624 | 6/1994 | Rogers et al. | 210/232 |
| 5,453,195 | 9/1995 | Jorgenson et al. | 210/444 |
| 5,490,930 | 2/1996 | Krull | 210/443 |
| 5,525,226 | 6/1996 | Brown et al. | 210/443 |
| 5,593,577 | 1/1997 | Imai et al. | 210/232 |

FOREIGN PATENT DOCUMENTS

24 45 454  9/1974  Germany ................... 210/DIG. 17

*Primary Examiner*—Jay H. Woo
*Assistant Examiner*—Frank Lawrence
*Attorney, Agent, or Firm*—Leydig, Voit & Mayer Ltd.

[57] ABSTRACT

A spin-on filter including an improved baseplate preferably die cast from aluminum provides an inventive outer gasket retaining groove. The baseplate comprises a hub joined to a rim by ribs. The rim provides a generally cylindrical wall and a seating surface extending radially outward therefrom. The cylindrical wall defines an inner vertical wall for the outer gasket retaining groove. Horizontal ribs extending from the top of the wall provides an inventive retaining device for securing and aligning an outer gasket in the retaining groove. The inventive baseplate can be used in filters with or without a seaming lid. The present invention improves the fastening technique for both types of aluminum in the baseplate filters.

19 Claims, 8 Drawing Sheets

SPIN-ON FILTER WITH IMPROVED RETAINING GROOVE

FIELD OF THE INVENTION

This invention relates to a filter for separating contaminants from fluids such as lubricating oil, hydraulic fluid, and the like. More specifically, this invention relates to a spin-on filter adapted to thread onto a mounting adaptor of a hydraulic circuit, lubrication system or other fluid system.

BACKGROUND OF THE INVENTION

Spin-on filters are commonly used to separate contaminants from fluid. Spin-on filters typically mount on a mounting adaptor of a fluid circuit and receive and return fluid therefrom. Spin-on filters typically include a steel canister housing a filter element, having a closed end and an open end. At the open end, various means have been used to provide a sealed connection to the mounting adaptor. The connection requires a flow path for contaminated fluid into the canister and a flow path for filtered fluid out of the canister. Threaded baseplates have commonly been used for the connection with outer gaskets providing a sealed connection.

Current applications in hydraulics frequently use high strength filters which are adapted for use in high pressure applications. These high strength filters are used in the hydraulic systems of heavy machinery for use in industries such as agriculture or construction, for example, a hydraulic circuit for a backhoe which powers the shovel motion. In such applications the filter must be capable of withstanding pressure spikes without bursting and continuous pressure surges for sustained periods without fatigue and leakage. Because of the high pressure requirements, it is often desirable to incorporate an aluminum die cast baseplate into the filter. However, as will be discussed, aluminum die cast baseplate filters have had difficulties providing for a retaining groove while at the same sufficiently fastening the baseplate to the canister.

Insofar as reliability and user convenience are concerned, an important element in spin-on filters is an outer gasket which will remain in position on the filter until locked in sealing relationship with the mounting adaptor of a hydraulic circuit. Outer gaskets prevent fluid leakage between the mounting adaptor and the filter. Outer gaskets are commonly positioned in outer gasket grooves formed at the connection end of a filter. One way of forming a groove has been to draw the sheet steel of a stamped steel seaming lid to form a generally U-shaped channel as shown in U.S. Pat. No. 5,490,930. Seaming lids provide an intermediate mechanism for fastening the baseplate to the canister. In filters not using seaming lids, a common approach to forming the groove has been to draw a portion of the sheet steel from the canister to form a channel. Another common approach has been to form a groove into the baseplate directly.

Outer gasket grooves commonly include retaining means for aligning and securing the outer gasket in the groove during installation of the filter. The retaining means also prevents the gasket from falling out of the groove during the handling and transportation of the filter. Heretofore, aluminum baseplate filters and other steel baseplate filters have had less than acceptable approaches for providing retaining means. One common approach of providing a retaining means has been to further draw the sheet steel of either the canister or a seaming lid to form a reverse draft or a lip as shown in Misgen et al., U.S. Pat. No. 4,834,885. This approach is undesirable for many reasons, primarily because further manufacture and undue drawing of steel is necessary.

U.S. Pat. No. 4,743,347 to Stifelman, shows a different approach for providing retaining means that is used for die-cast aluminum baseplates. As shown in Stifelman, vertical ribs are die cast into the inner wall of the groove. The vertical ribs extend in a straight vertical fashion from the base of the groove to the top of the groove. The vertical ribs have forcibly pinched the outer gasket against the outer wall of the groove.

The vertical rib approach has several drawbacks. One drawback is that the task of inserting and removing the outer gasket into a vertically ribbed groove is difficult because the outer gasket must be forced in and out of the groove. The vertical rib approach also has manufacturing difficulties. One difficulty is that small casting tolerances have been necessary for the groove, the vertical ribs and the baseplate. These small tolerances have been necessary to achieve proper pinching of the gasket. A small tolerance is also necessary for the outer gasket. These small tolerances undesirably increase the precision necessary in manufacturing the filter.

Other problems exist with the vertical rib approach. The pinching of the outer gasket may cause problems when the filter is operating in a hydraulic circuit. Pinching of the outer gasket with spaced vertical ribs may make the gasket uneven which can potentially cause leakage, particularly if the small tolerances needed for the groove and gasket are not met. This problem may be amplified because the metal of the baseplate and the flexible material of the gasket comprise different materials and expand from heat at different rates.

A further feature common to spin-on type filters is that the baseplate is fastened to the canister to prevent leakage and bursting. The fastening technique also transfers torque from the canister to the baseplate to allow filter installation and removal. A common way of fastening a baseplate to the canister has been to use a stamped sheet steel seaming lid as an intermediate fastening mechanism. Other past designs have fastened the baseplate to the canister without a seaming lid. Some of these designs have provided for aluminum die cast baseplates. U.S. Pat. Nos. 5,080,787, 4,743,374 and 4,834,885 generally disclose beading or wrapping the a portion of the open end of a canister over a preformed shoulder in the baseplate.

However, both types of filters, the filters with and without seaming lids, have had disadvantages. More specifically, it has been difficult to sufficiently fasten the canister to the baseplate while also providing an outer gasket groove. An undue amount of forming sheet steel has often been necessary in many of the filters to form a U-shaped channel, with further forming of steel necessary to provide gasket retaining means. In aluminum type baseplates, further drawing of stress sensitive steel has often been necessary to provide torque transfer because aluminum type baseplates cannot be welded to sheet steel to provide for torque transfer. Excessive or uneven forming of steel, and particularly the forming of steel at stress sensitive areas, can reduce the strength of the filter. Furthermore, the forming of steel has often required more complex tooling and manufacture which increases manufacturing costs.

SUMMARY OF THE INVENTION

A general aim of the present invention is to provide a filter with an improved outer gasket retaining means in the structure of the baseplate.

Another aim of the present invention is to provide an improved gasket groove for spin-on type filters which allows greater flexibility in filter design.

A specific object of the present invention is to reduce the tolerances necessary for the retaining grooves in die cast baseplates.

Another specific object of the present invention is reduce the drawing of sheet steel necessary to provide a retaining groove for an outer gasket.

In that regard, it is a further object to limit the drawing of sheet steel at stress sensitive locations.

Another specific object of the present invention is to eliminate the need to forcibly pinch the outer gasket in the groove to retain the outer gasket.

In achieving those aims and objectives, it is a feature of the present invention to provide improved is retaining means which are formed as part of the die cast baseplate. The retaining means of the present invention comprises horizontal ribs extending from the top of the groove inner wall, which is provided by the baseplate. The outer gasket can be stretched over the ribs and into the groove, the gasket then expanding toward the groove's inner wall. By expanding towards the inner wall, the groove retains the gasket without forcibly pinching the gasket and with limited drawing of steel to secure and align the gasket. The horizontal ribs expand the tolerances and lessen the precision necessary for die casting a groove into a baseplate.

It is another feature of the present invention that the retaining means of the present invention can be used in filters with or without a seaming lid. The retaining means of the present invention simplifies the design and assembly of filters both with and without seaming lids. In both types of filters, manufacturing and assembly of the rest of the filter is simplified by die casting the ribs into the baseplate. According to one embodiment, a seaming lid readily interfits with a baseplate to provide a retaining groove and torque transfer. The seaming lid provides tabs which closely fit into accommodating slots in the baseplate. According to another embodiment, an edge portion of the canister is folded into the gasket groove die cast into the baseplate. The edge portion is swaged inside the groove to provide torque transfer and sufficiently fasten the canister to the baseplate.

These and other objects and advantages of the invention will become more apparent from the following detailed description when taken in conjunction with the accompanying drawings.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION OF THE PREFERRED EMBODIMENT

Turning to the drawings, attention will first be directed to a first embodiment depicted in FIGS. 1–6 exemplifying various features of the present invention. For purposes of illustration and referring to FIG. 1, the present embodiment of the invention has been shown in the drawings as embodied in a spin-on filter 10 typically used for filtering contaminated fluid. The filter is spun onto a threaded portion of a mounting adaptor 11 to a fluid circuit. As can be appreciated by those skilled in the art, the mounting adaptor 11 includes an outlet for contaminated fluid and an inlet for cleaned fluid.

Figure 2:
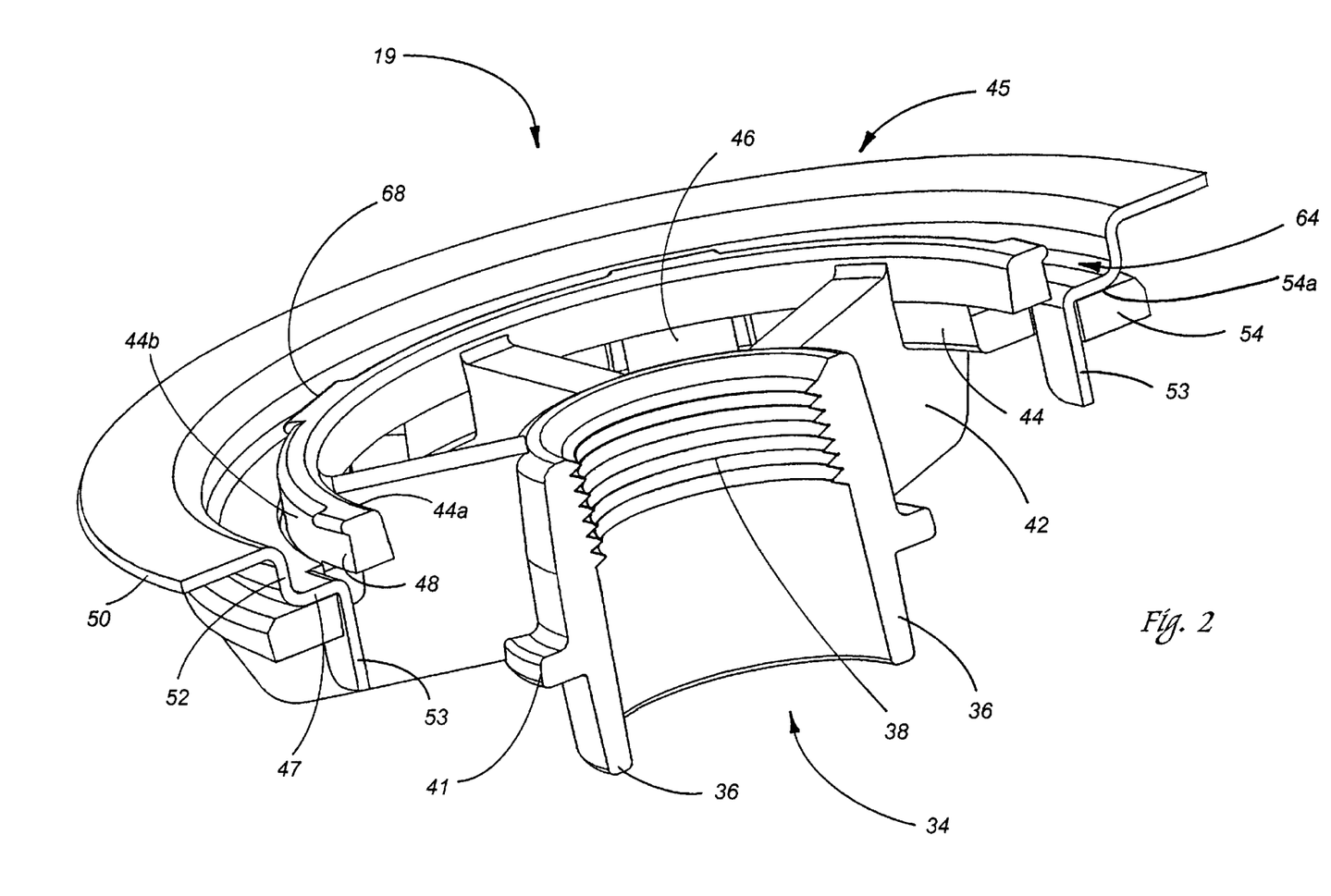
FIG. 2 is a perspective sectional view of a baseplate and seaming lid according to a preferred embodiment of the present invention.
Figure 3:
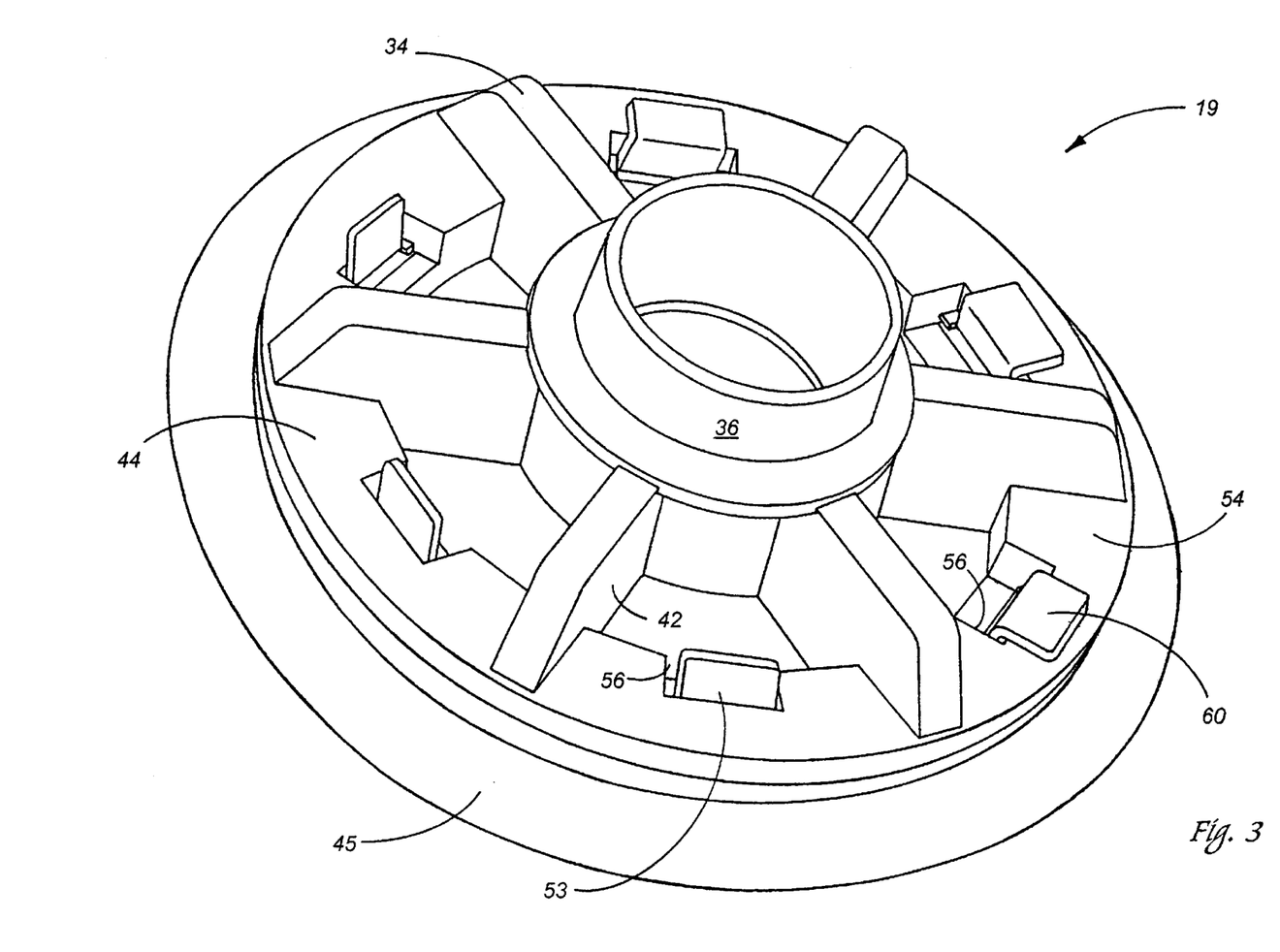
FIG. 3 is a perspective view of the bottom of a baseplate assembly according to the preferred embodiment of the present invention.

The filter 10 includes a deep drawn canister 12 made of relatively heavy gauge sheet steel. The canister 12 has a closed end 14, a longitudinally extending cylindrical sidewall 16, and an open end 18. A baseplate assembly 19, shown separately in more detail in FIGS. 2 and 3, is fastened at the open end 18 of the canister 12 and provides a fluidic connection to the mounting adaptor 11 of the hydraulic circuit.

Figure 1:
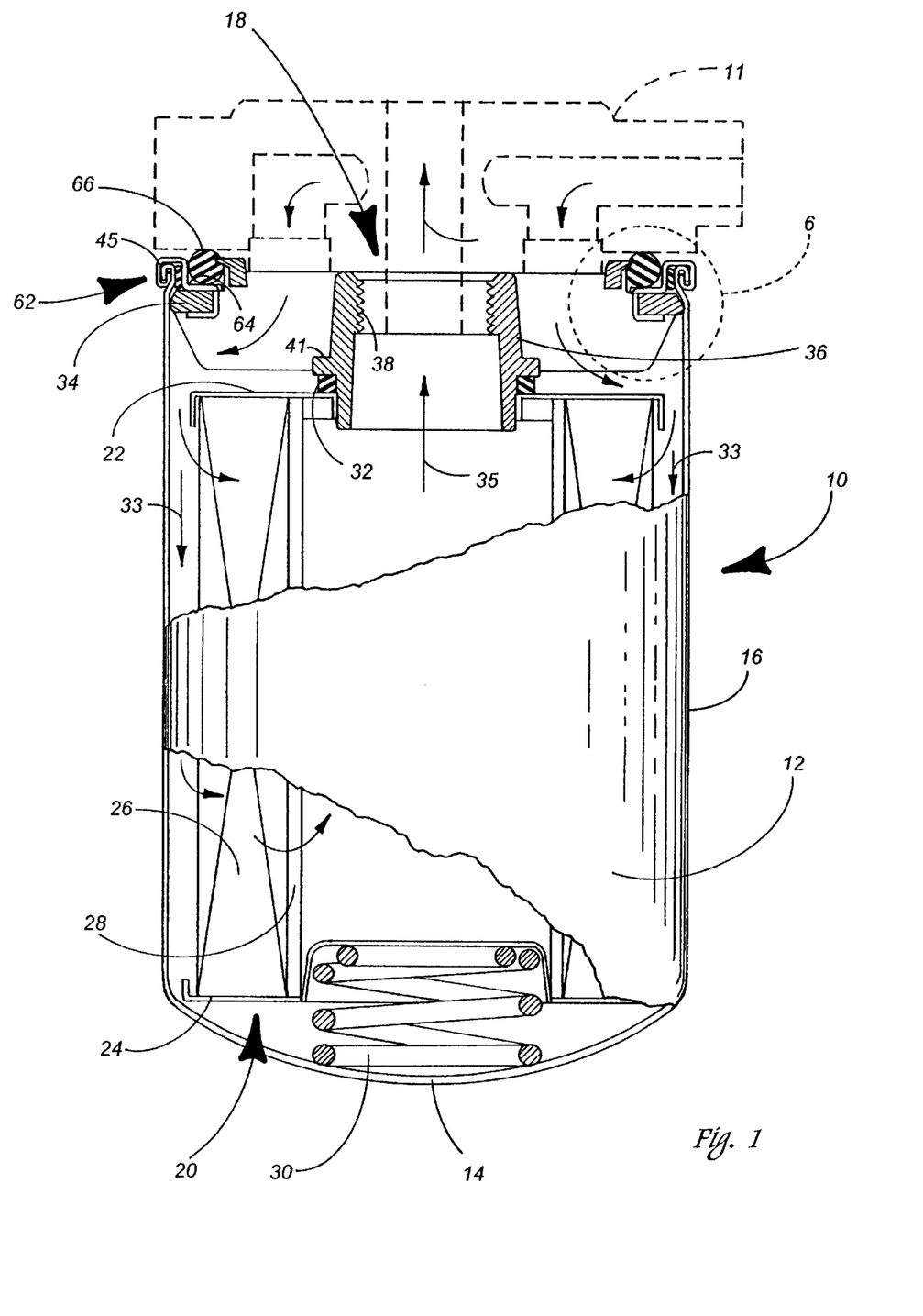
FIG. 1 comprises a cross-sectional view of a filter having a seaming lid according to a preferred embodiment of the present invention with hidden lines showing a mounting adaptor to which the filter is attached.

The canister 12 houses a tubular filter element 20 generally concentric to the sidewall 16. As shown in the present embodiment, the filter element 20 comprises two end caps 22, 24, suitable filter media 26 for removing contaminates from fluid and a perforated metal center tube 28. A coil spring 30 is located between the closed end 14 and the filter element 20. The upper end cap 22 includes a circular hole 31 which interfits with the baseplate assembly 19. The coil spring 30 compressed between the closed end 14 and the filter element 20, urges the filter element 20 against the baseplate assembly 19 thereby compressing an inner seal 32. The inner seal 32 prevents leakage between the baseplate assembly 19 and the filter element 20. The center tube 28 provides radial support for the filter element 20.

Contaminated oil or other fluid from the mounting adaptor 11 flows through the baseplate assembly 19 and into the canister 12 and along an outer flow path, represented by arrow 33, on the outside of the filter element 20. Fluid pressure forces the oil radially inward through the filter element 20 removing contaminants from the oil. Clean oil flows upward along an inner flow path, represented by arrow 35, in the upper end cap 22 and flows through the inside of the baseplate assembly 19 back to the mounting adaptor 11.

The filter of this invention can be adapted for high pressure hydraulic circuits which requires high strength in the baseplate. Accordingly, the exemplified embodiment provides a baseplate 34 that is preferably die cast aluminum. The baseplate 34 is shown separate from the filter in FIG. 4 and as part of the baseplate assembly 19 in FIGS. 2 and 3. Although a steel baseplate could work in the present invention, die casting aluminum can more readily provide the improved outer gasket groove and improved outer gasket retaining means of the present invention. Manufacturing costs are also reduced by die casting aluminum. The design of the baseplate 34 in the present invention also simplifies the manufacturing steps for the filter 10 by reducing the tooling and parts necessary to manufacture the filter 10.

Figure 4:
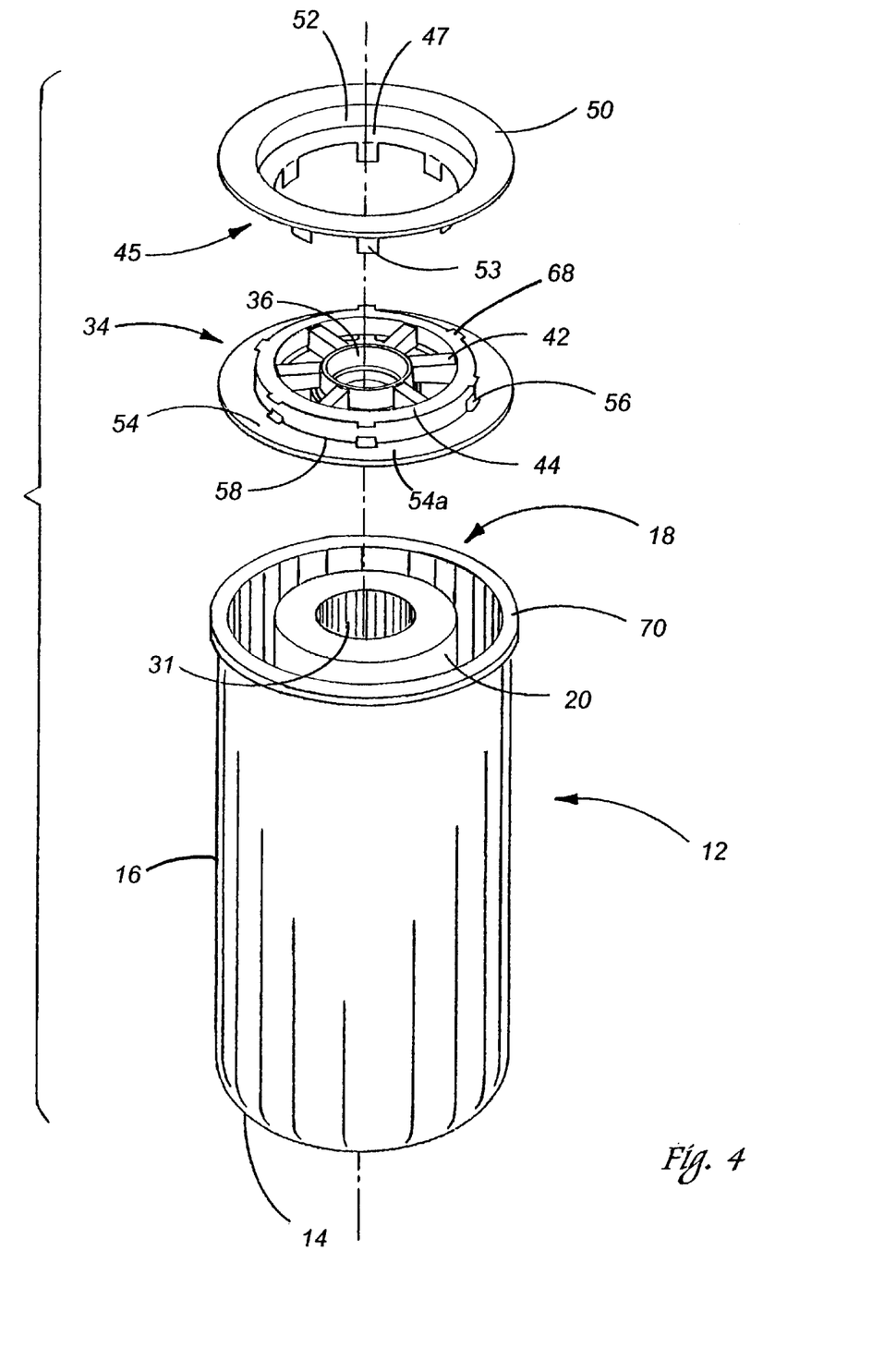
FIG. 4 comprises an pre-assembly exploded view of a canister housing a filter element, a baseplate, and a seaming lid according to the preferred embodiment of the present invention.

The presently embodied baseplate 34 is shown separate from the filter in FIG. 4 and as part of the baseplate assembly 19 in FIGS. 2 and 3. The present embodiment provides a baseplate 34 that serves several functions. The baseplate 34 includes a hub 36 with threads 38 that provide a connection to the mounting adaptor 11. The hub 36 is hollow enabling clean fluid to flow from the canister 12 to the mounting adaptor along inner flow path 35. The hub 36 interfits with the hole 31 in the filter element 20. The hub includes a lip 41 radially about a midsection of the hub 36 and sized larger than hole 33. The filter element 20 is biased against the lip 41 with an inner seal 32 compressed therebetween. The inner seal 32 prevents leakage of contaminated fluid in flow path 33 into the clean fluid in flow path 35.

The baseplate 34 includes multiple ribs 42 extending radially joining the hub 36 to a rim 44. A plurality of fluid inlet port orifices 46 are defined between the ribs 42 enabling contaminated fluid to flow into the canister 12 along outer flow path 33. In spin-on filters, the filter must resist leakage and bursting from fluid pressure inside the canister while also transferring torque applied to the canister 12 during installation and removal. To fasten the baseplate 34 to the canister 12, the exemplified embodiment in FIG. 1 provides a seaming lid 45. The baseplate 34 and the seaming lid 45 form the baseplate assembly 19 as shown in FIGS. 2 and 3.

Referring to the seaming lid 45 in greater detail, the present embodiment permits the simple stamping of sheet metal to form the seaming lid 45 with relatively simple and inexpensive tooling. The seaming lid 45 is shown as stamped in FIG. 4 and as assembled into the baseplate assembly 19 in FIGS. 2 and 3. Referring now to FIGS. 2 and 4, it is seen that the seaming lid 45 has a disc-like peripheral surface 47, which is generally radially planar. The peripheral surface 47 has an inner diameter which is sized larger than an outer diameter associated with a cylindrical wall 48 portion of the baseplate rim 44. The seaming lid 45 includes an outer seaming edge 50 joined in a stepped fashion to the peripheral surface 47 by a generally cylindrical erect wall 52. The peripheral surface 47 includes a plurality of tabs 53 extending axially opposite the erect wall 52 to be received by the baseplate 34.

The baseplate 34 includes a rim 44 having several structural features which interact and interfit with the seaming lid 45. The rim 44 includes a peripheral flange 54 extending radially outward from the cylindrical wall 48. The flange 54 provides a generally planar disc-shaped seating surface 54a for receiving the planar peripheral surface 47. The rim 44 also includes a plurality of slots 56 spaced for receiving the tabs 53 in a close fitting fashion. The slots 56 are spaced evenly on the flange 44 near a corner 58 between the flange seating surface 54a and the rim wall 48.

In the baseplate assembly 19 shown in FIGS. 2 and 3, the seaming lid 45 is closely fitted onto the seating surface 54a with the tabs 53 being closely fitted into the slots 56. The tabs 53 and accommodating slots 56 provide for torque transfer between the seaming lid 45 and the baseplate 34.

Figures 5, 6:
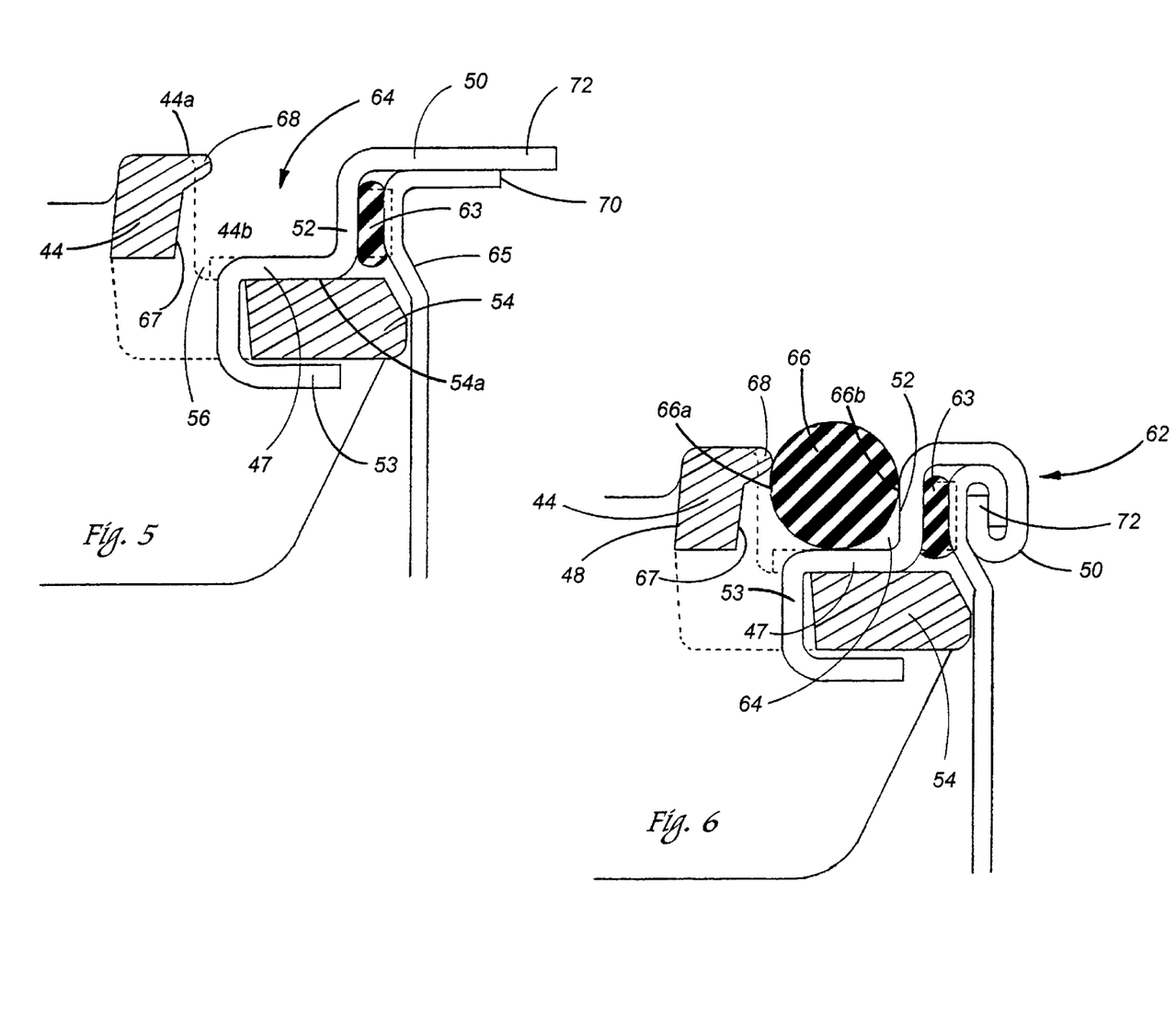
FIG. 5 is an enlarged fragmentary cross-sectional view taken about 6 of FIG. 1 in a pre-seamed state, showing a retaining groove without an outer gasket inserted.
FIG. 6 is an enlarged fragmentary cross-sectional view taken about section 6 of FIG. 1 better showing an outer gasket being retained by horizontal lugs.

Referring to FIG. 3, it is seen that end portions 60 of the tabs 53 are crimped to the flange 54 portion of the rim 44 to secure the baseplate 34 to the seaming lid 45. As best shown in FIGS. 1, 5 and 6, the outer edge 50 is deformed or seamed to the sidewall 16 of canister 12 forming a seam 62. The seam 62 fastens the seaming lid 45 to the canister 12 to secure the baseplate in the canister 12. The seam 62 resists pressure inside to prevent the filter 10 from bursting and the canister 12 from moving outward from the baseplate 34. Although the seam 62 may be liquid-tight by itself, the present embodiment provides a seam seal 63 inserted between a neck 65 of the canister 12 and the erect surface 52 to ensure liquid tightness. The seal 63 reduces fluid pressure on the seam 62 which further prevents bursting of the filter 10. The neck 65 is commonly formed during normal seaming operations of the seaming lid 34 and sidewall 16. The neck 65 preferably has an inner diameter large than the outer diameter of the baseplate rim 44 to transfer some of the stress from the canister 12 to the baseplate 34 directly without the seaming lid 45.

In accordance with the aims, objectives, and features of a preferred embodiment, the filter 10 provides a retaining groove 64 for receiving an outer gasket 66 for the present embodiment incorporating a seaming lid. The groove 64 is formed by interfitting the peripheral surface 47 of seaming lid 45 onto the flange 54 of the baseplate 34 with the tabs 53 fitted through the slots 56. Shown in further detail in FIGS. 5 and 6, the groove 64 has an outer wall provided by the erect surface 52, a base provided by the peripheral surface 47, and an inner wall 44b provided by the rim 44.

In accordance with the aims, objectives, and features of the present invention, the baseplate provides retaining means which reduces many difficulties associated with forming the groove 64 and inserting the outer gasket 66. As best shown in FIG. 2 the retaining means is provided by a plurality of horizontal ribs referred to herein as lugs 68 projecting horizontally outward from a top portion 44a of the rim 44. In the present embodiment, the lugs are spaced evenly about the top portion 44a of the rim 44. As seen best in FIGS. 5 and 6 the lugs 68 do not extend to the flange 54 but instead recess back to an inner wall portion of the rim indicated at 44b. In this particular embodiment, the lugs 68 are spaced evenly over the slots 56 with a cutout segment indicated at 67 in between each lug and slot so that the tabs slidably fit through the slots more easily.

Because the lugs 68 do not extend to the flange 53, the outer gasket can be stretched over the lugs or easily pushed past the lugs for insertion into the groove 64. After stretching the outer gasket 66 over the lugs and into the groove 64, the gasket will retain much of its original shape by having a portion indicated at 66a extend radially inward past the lugs 68 and toward the wall portion of the groove and rim indicated at 44b. A top portion of the gasket indicated at 66b extends above the lugs 68 for engaging the mounting adaptor. As shown in FIG. 6 it is not necessary for the gasket 66 to be in contact with the inner wall 44b, however as will be appreciated to those skilled in the art, depending on the size and position of the lugs 68 the outer gasket may contact groove inner wall 44b. As shown in FIG. 6, the gasket 66 is in contact with erect surface 52. However, it will be appreciated that if the outer gasket is stretched over the lugs 68, the gasket can be held in place without being in contact with the groove outer wall as has been shown.

By screwing the filter 10 onto the mounting adaptor 11, the outer gasket 66 is deformed and compressed into the groove (not shown) causing inner gasket portion 66a to expand toward the inner wall and/or a gasket outer portion, indicated at 66b, to expand toward the outer wall 52. Because no pinching of the gasket is necessary to initially retain the gasket in the groove, the groove shape and size can have greater variance. An advantage of the groove is that the gasket can have more space to expand. As best shown in FIGS. 5 and 6 the present embodiment permits the gasket to freely expand towards the inner wall 44b.

It should be apparent at this point that the present approach to providing a retaining groove and retaining means is improved over the prior art because the forcibly pinching of the outer gasket is not necessary. This allows for greater tolerances in the die casting of the baseplate and overall manufacture of the filter. This also provides for greater design flexibility in the filter.

Although the assembly procedure for the filter 10 of the present invention has been described in some detail above, the preferred method of assembly described below reduces manufacturing steps, parts and cost. The primary components of the assembly procedure are shown in FIG. 4 and described below.

To form the canister 12, relatively heavy gage steel is drawn to provide the cylindrical sidewall 16, the closed end 14, and the open end 16 having a disc shaped brim 70 extending radially beyond the sidewall. The filter element 20 is then inserted into the canister 12.

To form the baseplate 34, aluminum is die cast to form the hub 36 with the lip 41 (shown in FIG. 1) residing radially about a midsection of the hub and the rim 44 joined by ribs 42 to the hub, the rim 44 providing the retaining lugs 68 and the radially outwardly extending flange 54 with slots 56. As illustrated best in FIGS. 2 and 4, it may be seen that the retaining lugs 68 are die cast directly over and spaced evenly with the corresponding slots 68. This corresponding relationship between the lugs 68 and slots permits easier die casting of the baseplate because the corresponding molding die can comprise core pins (not shown) which extend up through the slots 56 to the lugs 68 from bottom side of the baseplate rim, the bottom side being opposite the side of the groove 64. By using molding core pins (not shown), the corresponding casting die (not shown) for the baseplate does not need any additional split to provide the slots and lugs which simplifies the casting process. Threads 38 are tapped into the hub 36 to provide a connection for the mounting adaptor.

To form the seaming lid 45, sheet steel is stamped to interfit with the baseplate 34, by providing the outer edge 50 with the end portion 72 that radially extends just beyond the brim 70 (shown in FIGS. 5 and 6), the outer edge joined by the erect surface 52 to a peripheral surface 47 with tabs 53 extending from the cylindrical surface 46 spaced to interfit with the slots 56.

Referring now to FIGS. 2, 3, and 4, the baseplate 34 and the seaming lid 45 are interfit by locating the peripheral surface 47 on the flange 54. This forms the groove 64. The tabs 53 are received into the slots 56 to provide for torque transfer. To further secure the baseplate 34 and seaming lid 45, end portions 60 of the tabs 53 are deformed about the rim 44 thereby affixing the baseplate 34 to the seaming lid 45 forming the baseplate assembly 19 with groove 64. Preferably, a seam seal 63 may be fitted around the seaming lid 45 before insertion into the baseplate 34.

The baseplate assembly 19 is fitted into the canister with the hub 36 protruding into the filter element 20, and an inner seal 32 compressed between the lip 41 and the filter element 29. While an inner seal 32 is shown in the exemplified embodiment, other methods exist to prevent fluid transfer between the baseplate and the filter.

In the pre-assembled state shown best in FIGS. 4 and 5, the canister 12 includes a radially outwardly extending brim 70 and the seaming lid 45 includes an radially outwardly extending outer edge 50, having an end portion 72 extending beyond the brim 70. The outer edge 50 and the brim 70 are seamed by normal seaming operations. In the exemplified embodiment of the present invention, seaming is accomplished by inwardly deforming the canister 12 near the brim 70 to form a neck 65 thereby compressing the seam seal 63 as shown in FIG. 6. The end portion 72 of the outer edge 50 is then curled around the brim 70. The brim 70 and outer is edge 50 are deformed downwardly thereby forming a seam 62 as shown in FIG. 6. An outer gasket 66 is then inserted into the already pre-formed groove 64 by easily stretching or pushing the gasket over the lugs and releasing the gasket into the groove to complete the filter.

Figure 7:
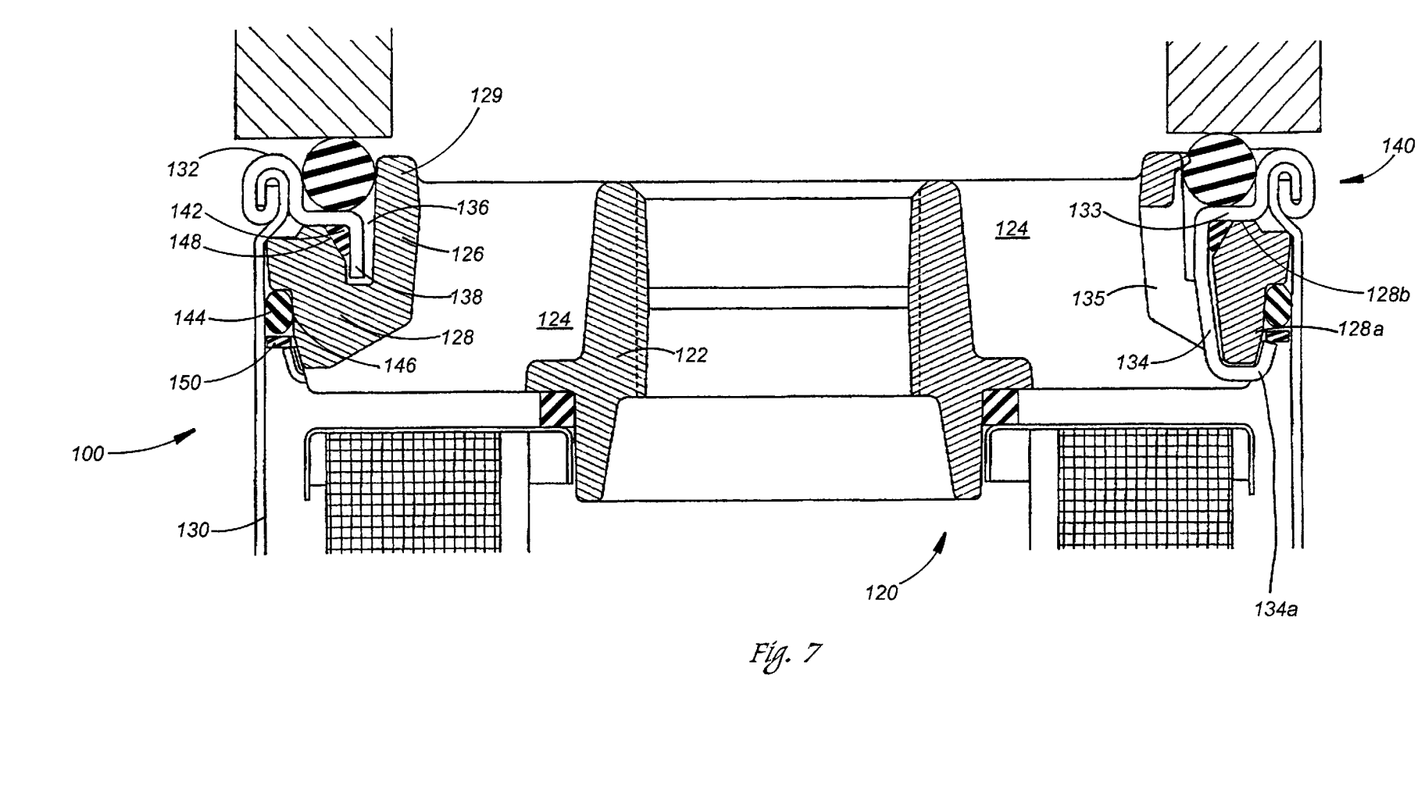
FIG. 7 is a cross-sectional fragmentary view of a filter illustrating an alternative preferred embodiment of the present invention showing additional strength enhancing features for a seaming lid type filter.

Turning now to a preferred embodiment exemplified in FIG. 7, a preferred strength enhanced filter 100 utilizing the inventive seaming lid and baseplate concepts of FIGS. 1–6 is exemplified. More specifically, the embodiment of FIG. 7 provides the die cast horizontal retaining lugs in a similar fashion as for the embodiments depicted in FIGS. 1–6, but with certain improvements intended to provide high pressure capacity. It can be understood that filter 100 filters fluid in much the same general manner as the previous embodiments depicted in FIGS. 1–6. However, filter 100 is provided with multiple preferred strength enhancing features not provided in FIGS. 1–6, and attention will now be directed to those features. In viewing FIG. 7 it will be appreciated that the inventive features provided by the present invention can be adapted for higher, intermediate or lower pressure fluid applications. The preferred strength enhancing features described and shown in FIG. 7 provides for a filter having a burst strength of at least 1000 p.s.i. and impulse strength of at least 0–300 p.s.i. for 100,000 cycles.

Referring now in greater detail to the filter 100 illustrated by FIG. 7, it is seen that the baseplate 120 is similar to baseplate 34 in FIG. 2. The baseplate 120 has a central hub 122 connected by ribs 124 to a rim 126. One strength enhancing feature is that the rim 126 includes a thicker flange portion 128 extending radially outward a rim cylindrical wall 129. To provide for fastening mechanism between the canister 130 and the baseplate 120, the present embodiment uses a seaming lid 132. The seaming 132 also includes a generally disc shaped peripheral surface 133 seated on a seating surface portion 128b of the flange 128 to form an outer gasket groove.

Similar to the previous embodiment, a plurality of tabs 134 from the seaming lid 132 are received by corresponding slots 135 in the flange 128. However, in the present embodiment, the tabs 134 are generally bent at greater than 90 degrees with an end portion 134a bent further around a narrower elongated bottom portion of the flange 128a. Further bending the an edge portion 134a around the flange portion 128a, prevents the potential problem of the tabs 134 urging out of the slots 135 which may result from high fluid pressure from inside the filter 100 which urges the canister 130 outward and likewise the seamed seaming lid 132. Thus bending the tabs 134 at greater than 90 degrees further allows the filter 100 to withstand high pressure surges.

Another strength enhancing feature is that the flange 128 defines a continuous cylindrical channel 136 extending vertically into the flange 128. The seaming lid 134 has a continuous vertical cylindrical band 138 sized slightly smaller than the channel 136 and fitted into the channels 136. The band 136 extends from the peripheral surface 135 in a stepped and vertical fashion towards the inside of the canister 130. By providing band 138 and slit 136, pressure forcing the canister outward is relieved from the band 138 to the baseplate 120 via the walls of the channel 136. As also seen in FIG. 7 the cylindrical band 138 provides the tabs 132 fitted into the slots 130 which extends the tabs further into the filter 100.

To minimize fluid pressure on the seam 140 which prevents leakage and bursting, inner gasket ring seals 142, 144 are assembled into the filter. The flange 128 has accommodating tapers 146, 148 for receiving and compressing the inner seals 142,144 respectively. Seal 142 is inserted over the seaming lid 134 and compressed against the baseplate 120 to prevent fluid transfer between seaming lid and baseplate. Seal 144 is inserted over the flange 128 and compressed against the canister 133 to prevent fluid transfer between the canister 133 and the baseplate 120. Also shown in FIG. 7 is a steel or plastic ring 150 held in place by the hook portion of the tab 134a. Ring 150 helps align and retain seal 144 during assembly of the filter.

Figure 8:
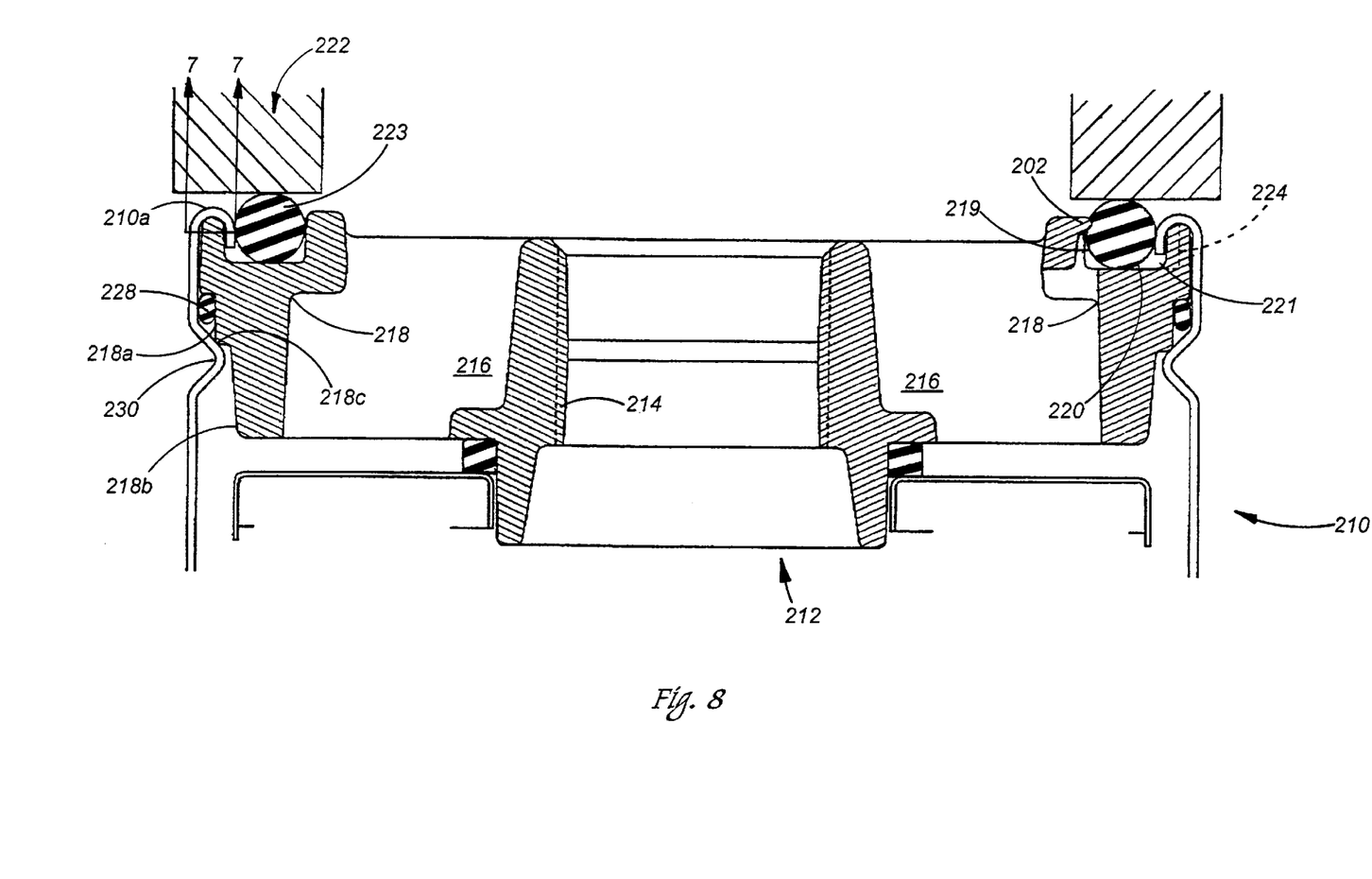
FIG. 8 is a cross-sectional cut-away view of a filter without a seaming lid according to an alternative embodiment of the present invention.
Figure 9:
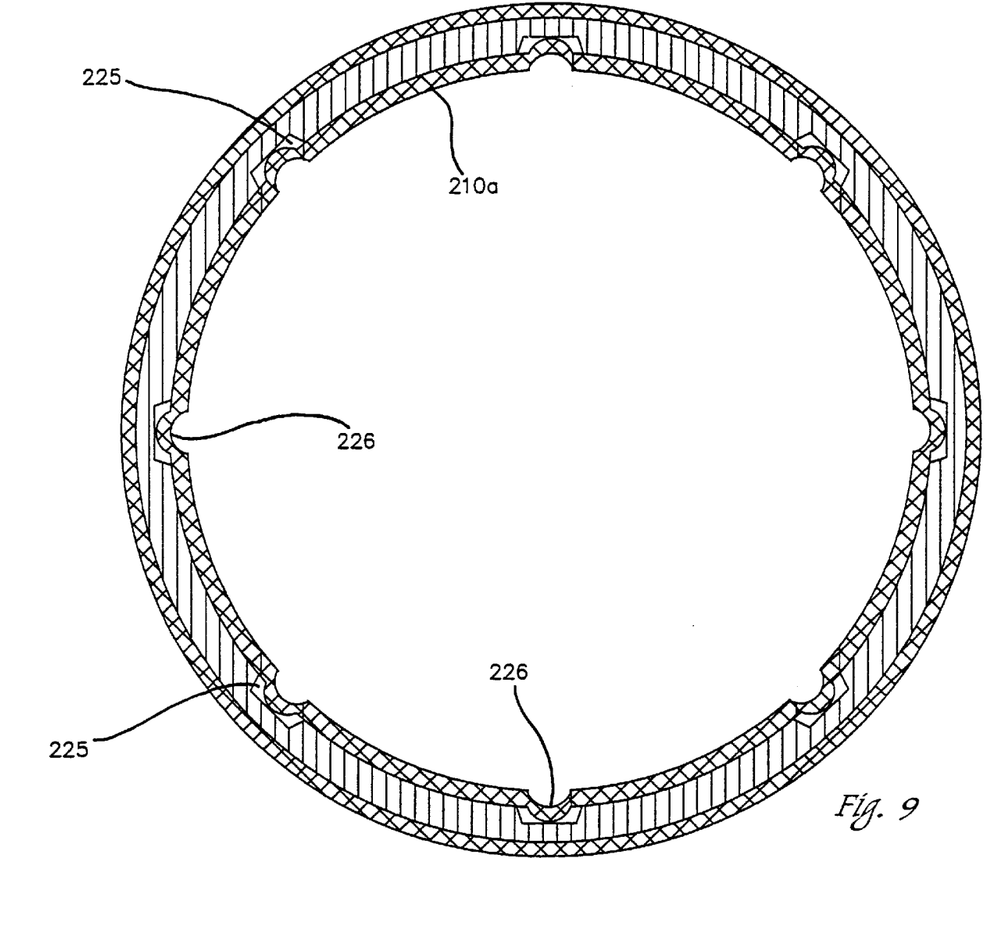
FIG. 9 is a cross-sectional fragmentary view taken about line 7 of FIG. 8 showing torque transfer means between the canister and the baseplate.
Figure 10:
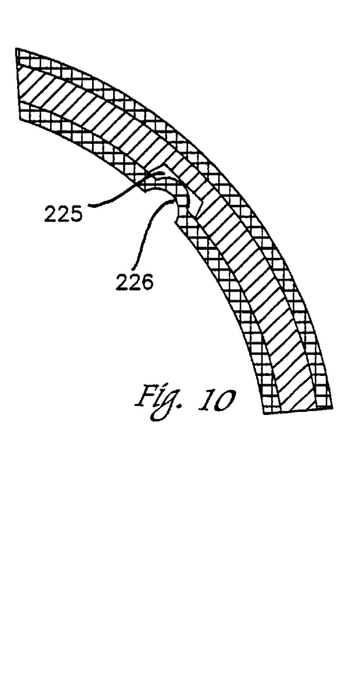
FIG. 10 is an enlarged cross-sectional and cut-away view, better showing a mechanism for torque transfer.

Turning now to FIGS. 8–10, a preferred embodiment of a filter 200 not having a seaming lid but including the inventive retaining means in the form of multiple horizontally extending lugs 202 is exemplified. It can be understood that filter 200 filters fluid and retains the outer gasket a similar manner as the previous embodiments depicted in FIGS. 1–6.

Referring now in greater detail to FIG. 8, the filter 210 comprises a simplified baseplate 212 providing an outer gasket retaining groove and a mechanism for torque transfer. As in previous embodiments, the baseplate 211 comprises a hub 214 connected by ribs 216 to an outer rim 218. The rim 218 also includes an inner wall 219 and a outwardly extending flange seating surface 220. However, the presently exemplified baseplate is different from the previous embodiment in that the rim 218 includes an outer wall 221 at the outer radial periphery of the seating surface 220 to form a generally U-shaped groove indicated generally at 222 for receiving an outer gasket 223. The U-shaped groove 222 is generally located between groove inner wall 219 and the rim outer wall 221 with the seating surface 220 as a bottom base.

In accordance with the aims and objectives, the present embodiment provides horizontal retaining ribs shown as lugs 202. The lugs 202 are provided by the groove inner wall 219 and function in a similar manner as was outlined for the lugs 68 of the first embodiment. As such it will be appreciated that the groove 222 does not need a reverse draft in the sheet steel of outer wall 221 to forcibly pinch the outer gasket 223 against the lugs 202 to retain gasket 223. An advantage or not needing a reverse draft is that the outer wall 221 is much better adapted for other purposes such as fastening purposes. Yet another advantage of the present embodiment as compared with other prior art aluminum baseplate filters is that larger tolerances are acceptable for the die cast baseplate and for other manufactured components such as the outer gasket.

It may also be seen that the retaining lugs 202 are die cast directly over and spaced evenly with corresponding slots 224. Although the present embodiment does not use the slots 224 for torque transfer, this corresponding relationship between the lugs 202 and slots 224 permits easier die casting of the baseplate 212 because the corresponding molding die can comprise core pins (not shown) which extend up through the slots 224 to the lugs 202 from bottom side of the baseplate rim 218, the bottom side being opposite the side of the groove 223. By using molding core pins (not shown), the corresponding casting die (not shown) for forming the groove 223 does not need a split to provide the lugs 202 which simplifies the casting process. However, it will be understood that a split in the corresponding casting die (not shown) for the groove can also be used which eliminates the slots 224.

A preferred torque transferring fastening mechanism utilizing the retaining groove is also exemplified in FIG. 8. As seen in FIG. 8, a continuous edge portion 210a of the canister 210 is wrapped over the outer wall 221 and into the groove 222 to secure the canister 210 to the baseplate 212. Because forcible pinching and a reverse draft on the groove outer wall is not necessary, the edge portion 210a is readily located on the inner diameter of the groove outer wall and utilized for torque transfer. The present embodiment provides torque transfer in the baseplate structure by providing a plurality of slot-like notches 225 on the inner diameter of the outer wall 221. The preferred embodiment of the notches is shown better in FIG. 9, and is magnified in FIG. 10. It is seen that the canister edge 210a has segments 226 deformed or swaged into these notches 225 thereby providing torque transfer between the canister and baseplate.

An advantage of placing the notches 225 on the inner diameter of the outer wall 221 is that failure of the filter is less likely. Filter failure is less likely because the stress from fluid pressure in the canister 210 is generally carried by the top of the outer wall 221 which corresponds to a portion of the canister that does not include deformed segments 226. Deforming the canister unevenly as with the segments 226 can weaken the canister. The segments 226 could potentially decrease filter strength if stress was carried by or through the segments as would be the case if the segments and notches were on the outer diameter of the outer wall 221. By fastening the canister to the baseplate directly, there is also no need for a seaming lid.

The present embodiment also shows an approach to reduce fluid pressure and leakage to the seam. To prevent leakage and fluid transfer between the canister 210 and the baseplate 212, a inner ring gasket seal 228 is compressed in between the flange 220 and the canister 210. The flange 220 provides taper 218a for accommodating the seal 228. To align the baseplate 212 and seal 228 during manufacture, the canister includes a continuous beaded ring 230 accommodated by flange taper 218b. The beaded ring 230 engages flange corner 218c to further prevent leakage between the canister 210 and the baseplate 212.

What is claimed is:

1. A filter comprising:
   a canister having a closed end, a cylindrical sidewall and an open end, the canister housing a filter element;
   a die cast baseplate fastened to the canister at the open end, the baseplate having a hub and an outer rim joined by ribs, the rim including a wall extending vertically and a flange portion extending radially outward from the wall thereby providing a seating surface; and
   gasket retaining means integrally connected to the die cast baseplate for retaining an outer gasket, said gasket retaining means projecting horizontally from the top of the wall and recessing radially inward towards the wall as the retaining means extends vertically towards the seating surface.

2. The filter as in claim 1, wherein the baseplate combined with a form of sheet steel define a generally U-shaped outer cylindrical groove for receiving an outer gasket ring.

3. The filter as in claim 1, wherein the rim includes an outer wall extending vertically from the seating surface, an outer gasket ring interposed between the outer wall and the wall.

4. The filter as in claim 3, wherein the canister has an edge portion at the open end, the edge portion folded over the outer wall of the baseplate and into a groove for receiving the outer gasket, the edge portion being torqueably attached to the outer wall.

5. The filter as in claim 4, wherein the outer wall defines a plurality of notches located on an inner diameter of the outer wall, the edge portion of the canister swaged into the notches.

6. The filter as in claim 1, further comprising a seaming lid, the seaming lid having an outer edge seamed to the canister, and a peripheral disc shaped surface fitted into the seat, the seaming lid and baseplate defining a cylindrical groove for receiving an outer gasket ring.

7. The filter as in claim 6, wherein the seaming lid has a plurality of tabs, the baseplate has a plurality of slots for receiving the tabs, the tabs being fitted through the slots and crimped to the baseplate.

8. The filter as in claim 1, wherein the baseplate comprises die cast aluminum material.

9. The filter as in claim 1, wherein said retaining means comprises a plurality of die cast horizontal retaining ribs radially about the top of the wall.

10. The filter as in claim 9, wherein the baseplate further comprises a plurality of apertures defined adjacent to a corner between the seating surface and the wall, the apertures being in corresponding relationship with the die cast horizontal retaining ribs being spaced evenly in axial relationship therewith.

11. A spin-on filter comprising:
a canister having a closed end, a cylindrical sidewall and an open end, the canister housing a filter element, the sidewall including an edge portion at the open end;
a die cast baseplate having a threaded hub and an outer rim, a plurality of ribs joining the threaded hub and the rim, the rim comprising an inner wall joined by a radially outward seating surface to an outer wall, the inner diameter of the outer wall defining a plurality of notches with the edge portion of the canister being hemmed into the notches;
an outer gasket interposed in an annular groove between the edge portion and the inner wall; and
gasket retaining means die cast into the baseplate for retaining an outer gasket between the edge portion and the inner wall, said gasket retaining means projecting horizontally outward from the top of the inner wall and recessing radially inward towards the inner wall as the retaining means extends vertically toward to the seating surface.

12. The spin-on filter as in claim 11, wherein the gasket retaining means comprises a plurality of die cast horizontal retaining ribs radially about the top of the inner wall.

13. The spin-on filter as in claim 12, wherein the baseplate further comprises a plurality of apertures defined near a corner between the seating surface and the inner wall, the apertures being in corresponding relationship with the die cast horizontal retaining ribs being spaced evenly in axial relationship therewith.

14. The spin-on filter a in claim 11, further comprising an inner ring seal compressed between the baseplate and the canister.

15. A spin-on filter comprising:
a canister having a closed end, a cylindrical sidewall and an open end, the canister housing a filter element;
a die cast baseplate having a threaded hub and an outer rim, ribs joining the threaded hub and the rim, the rim comprising a generally cylindrical wall
and a flange extending radially outward from the cylindrical wall thereby providing a seating surface;
a seaming lid fastened to the baseplate and seamed to the canister for torque transfer between the baseplate and the canister, the seaming lid and the baseplate defining an annular groove for receiving an outer gasket, the cylindrical wall providing a radially inside wall for the annular groove; and
gasket retaining means die cast into the cylindrical wall of the baseplate for securing an outer gasket in the groove, the gasket retaining means projecting horizontally outward from the top of the cylindrical wall and recessing radially inward towards the cylindrical wall as the gasket retaining means extends vertically toward the seating surface.

16. The spin-on filter as in claim 15, wherein the gasket retaining means comprises a plurality of horizontal retaining ribs extending radially outward from the top of the cylindrical wall.

17. The spin-on filter as in claim 16, wherein the baseplate further comprises a plurality of apertures defined near a corner between the seating surface and the cylindrical wall, the apertures being in corresponding relationship with the horizontal retaining ribs and being spaced evenly in axial relationship therewith.

18. The spin-on filter as in claim 17, wherein the seaming lid comprises a plurality of tabs and a peripheral disc shaped portion, the peripheral disc shaped portion interfitting with the seating surface with the tabs closely fitted in the apertures, the tabs being crimped to affix the baseplate to the seaming lid.

19. The spin-on filter is in claim 15 wherein the baseplate comprises aluminum die cast material.

* * * * *